United States Patent
Yamada

(10) Patent No.: US 11,123,746 B2
(45) Date of Patent: Sep. 21, 2021

(54) SHREDDER AND SHEET MANUFACTURING APPARATUS

(71) Applicant: SEIKO EPSON CORPORATION, Tokyo (JP)

(72) Inventor: Kentaro Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 16/521,648

(22) Filed: Jul. 25, 2019

(65) Prior Publication Data
US 2020/0030810 A1 Jan. 30, 2020

(30) Foreign Application Priority Data

Jul. 27, 2018 (JP) .............................. JP2018-141617

(51) Int. Cl.
| | |
|---|---|
| *B02C 18/22* | (2006.01) |
| *D21B 1/32* | (2006.01) |
| *D21C 5/02* | (2006.01) |
| *B02C 18/18* | (2006.01) |
| *D21F 9/00* | (2006.01) |
| *D21B 1/10* | (2006.01) |

(Continued)

(52) U.S. Cl.
CPC .......... *B02C 18/225* (2013.01); *B02C 18/182* (2013.01); *D21B 1/32* (2013.01); *D21C 5/02* (2013.01)

(58) Field of Classification Search
CPC . B02C 18/225; B02C 18/182; B02C 18/0076; B02C 18/26; B02C 18/0007; D21B 1/32; D21B 1/10; D21C 5/02; Y02W 30/64; D21F 9/00

See application file for complete search history.

(56) References Cited

U.S. PATENT DOCUMENTS 3,396,914 A * 8/1968 Liebman ............. B02C 18/0007
241/63
5,551,825 A * 9/1996 Montgomery ...... B02C 18/0076
414/412

(Continued)

FOREIGN PATENT DOCUMENTS

| CN | 101791586 A | 8/2010 |
| CN | 102327890 A * | 1/2012 |

(Continued)

OTHER PUBLICATIONS

English translate (DE9315282U1), retrieved date Mar. 17, 2021.*
English translate (CN102327890A), retrieved date May 25, 2021.*

*Primary Examiner* — Adam J Eiseman
*Assistant Examiner* — Mohammed S. Alawadi
(74) *Attorney, Agent, or Firm* — Global IP Counselors, LLP

(57) ABSTRACT

Provided are a shredder assuring greater freedom in designing a feedstock supplier that supplies sheets, and a sheet manufacturing apparatus. The shredder has a feedstock supplier having a supply opening through which a sheet is supplied; and a shredding device configured to shred the sheet supplied from the feedstock supplier. The shredding device includes a rotary cutter that rotates on a first axis, and a circulating cutter that moves in an endless path and cuts the sheet in conjunction with the rotary cutter. The circulating cutter includes a conveyor configured to convey the sheet from the feedstock supplier to the rotary cutter.

11 Claims, 6 Drawing Sheets

(51) Int. Cl.
*B02C 18/00* (2006.01)
*B02C 18/26* (2006.01)

(56) References Cited

U.S. PATENT DOCUMENTS

| | | | |
|---|---|---|---|
| 5,762,463 A * | 6/1998 | Bielagus | ............ B65B 69/0008 |
| | | | 414/412 |
| 2010/0181405 A1 | 7/2010 | Bouwhuis et al. | |
| 2016/0145803 A1 * | 5/2016 | Higuchi | .................... D21F 1/60 |
| | | | 162/357 |

FOREIGN PATENT DOCUMENTS

| | | | | |
|---|---|---|---|---|
| CN | 106964445 A | | 7/2017 | |
| DE | 9315282 U1 | * | 12/1993 | ......... B65B 69/0008 |
| JP | 2007-268335 A | | 10/2007 | |

\* cited by examiner

SHREDDER AND SHEET MANUFACTURING APPARATUS

BACKGROUND

1. Technical Field

The present invention relates to a shredder and a sheet manufacturing apparatus.

This application is based upon Japanese Patent Application 2018-141617 filed on Jul. 27, 2018, the entire contents of which are incorporated by reference herein.

2. Related Art

Shredders for cutting sheet media into small shreds are known from the literature. See, for example, JP-A-2007-268335. The shredder described in JP-A-2007-268335 has multiple, disk-shaped rotary cutters. Sheets (feedstock) to be shredded are shredded by rotation of the rotary cutters as the feedstock passes between the rotary cutters.

The shredder described in JP-A-2007-268335 has a pair of guide panels as part of a supply unit that supplies the feedstock toward the rotary cutters. The guide panels are disposed in mutual opposition with a space therebetween. The feedstock passes between the pair of guide panels toward the rotary cutters, and is then shredded by the rotary cutters.

Because the pair of guide panels in the shredder described in JP-A-2007-268335 function to guide the feedstock to the rotary cutters, the guide panels must be disposed as close to the rotary cutters as possible. As a result, the distance between the guide panels, the location of each guide panel, and other design parameters are limited.

SUMMARY

The present invention is directed to solving the foregoing problem, and may be embodied as described below.

A shredder according to a preferred aspect of the invention includes a feedstock supplier having a supply opening through which a sheet is supplied; and a shredding device configured to shred the sheet supplied from the feedstock supplier. The shredding device includes a rotary cutter that rotates on a first axis, and a circulating cutter that moves in an endless path and cuts the sheet in conjunction with the rotary cutter. The circulating cutter includes a conveyor configured to convey the sheet from the feedstock supplier to the rotary cutter.

Another aspect of the invention is a sheet manufacturing apparatus including a shredder according to the invention, and configured to make a new sheet from feedstock acquired by the shredder shredding a sheet.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of a shredder and a sheet manufacturing apparatus according to the invention are described below with reference to the accompanying figures.

Embodiment 1

Figure 1:
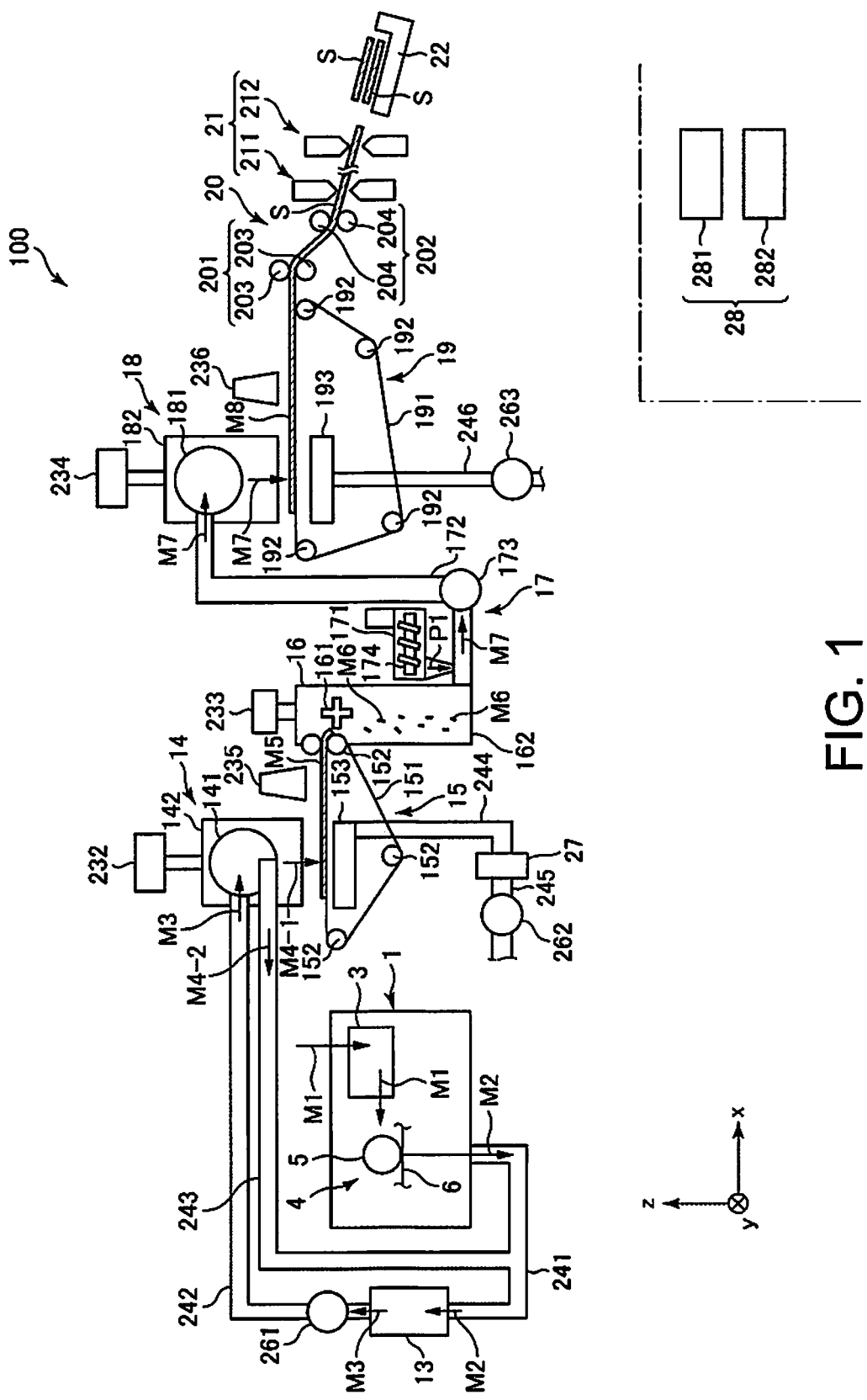
FIG. 1 is a schematic side view of a first embodiment of a sheet manufacturing apparatus according to the invention.
Figure 2:
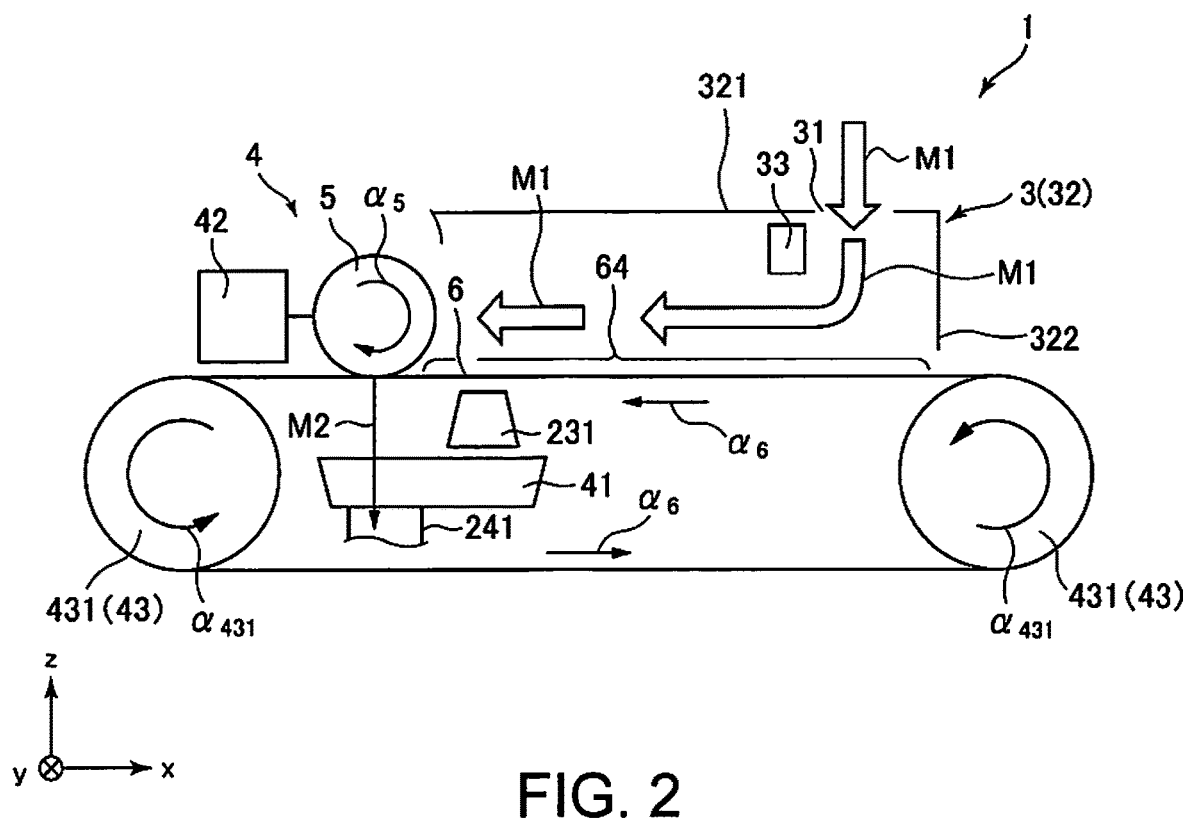
FIG. 2 is a schematic side view of a shredder according to the invention that is incorporated in the sheet manufacturing apparatus shown in FIG. 1.
Figure 3:
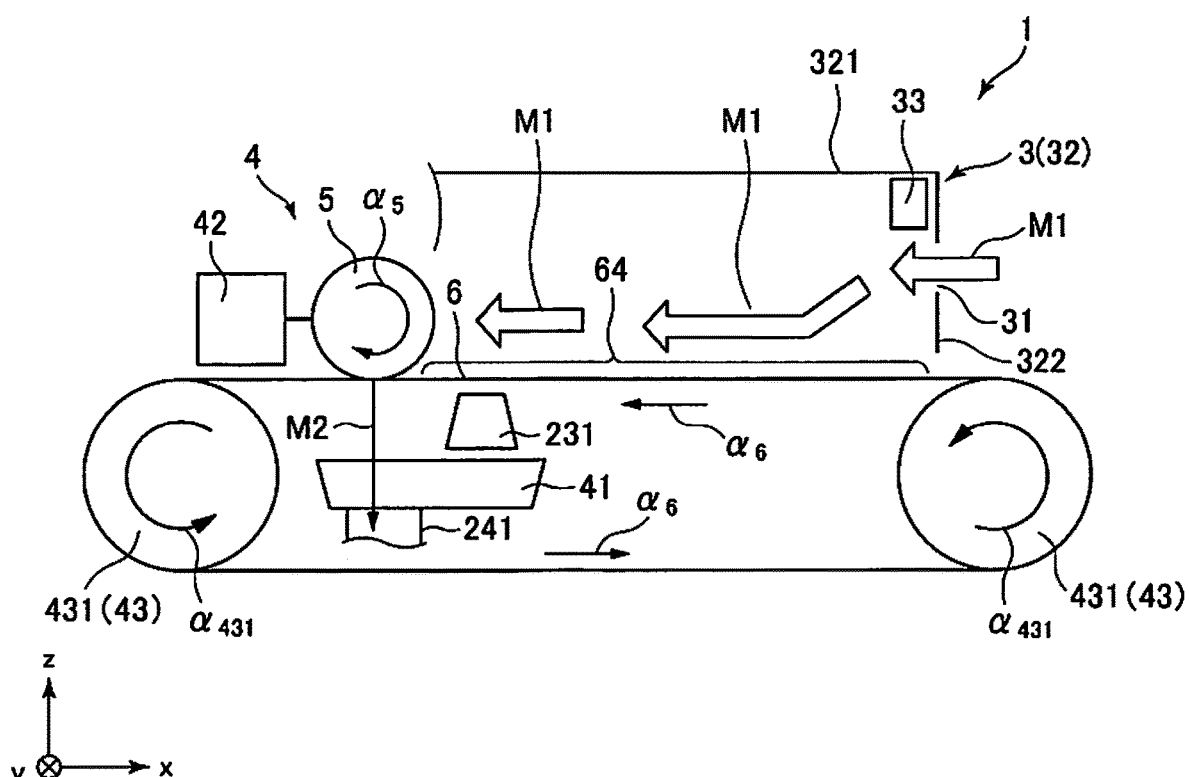
FIG. 3 is a schematic side view of a variation of a shredder according to the invention that is incorporated in the sheet manufacturing apparatus shown in FIG. 1.
Figure 4:
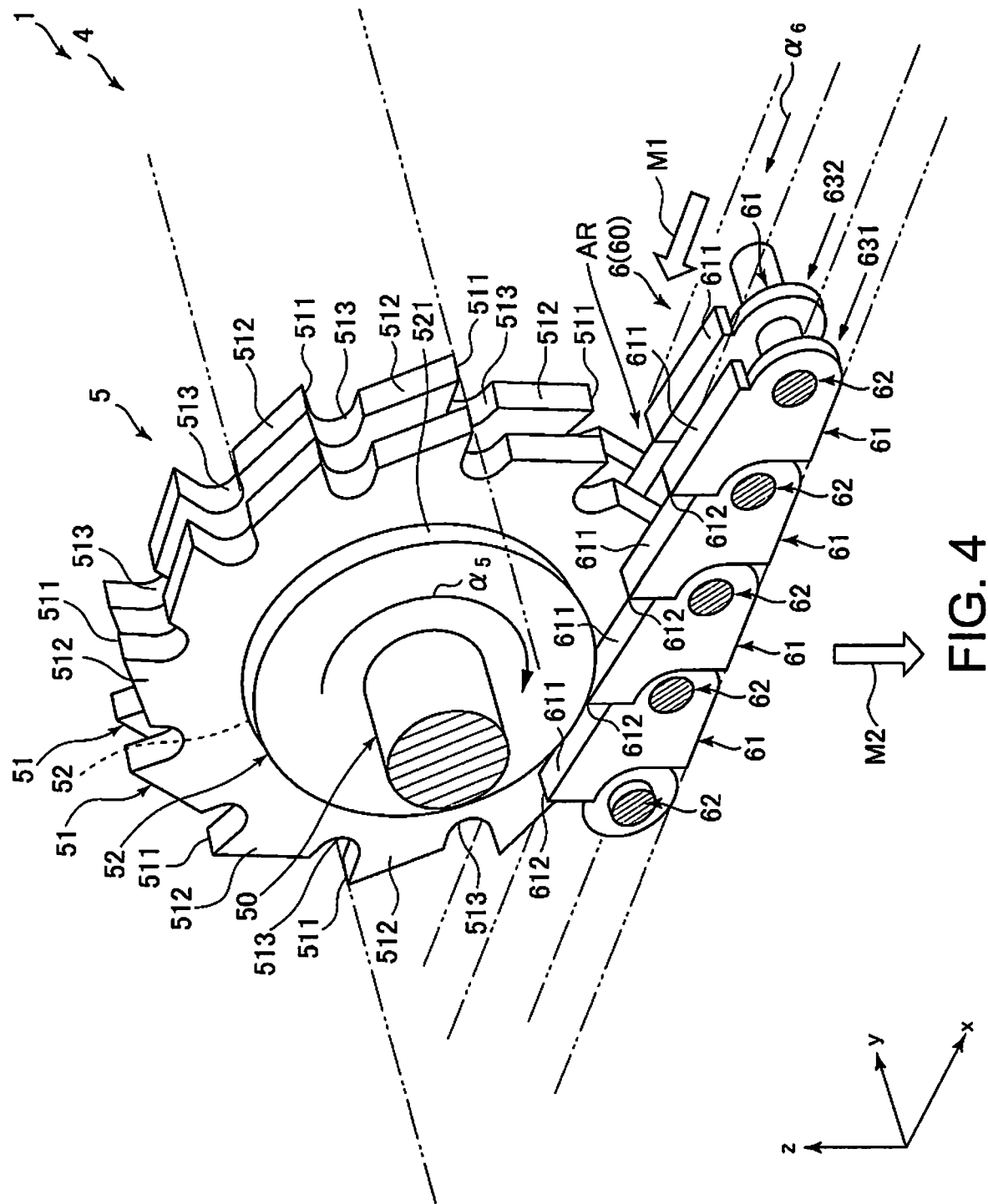
FIG. 4 is a perspective view of main parts of the shredders shown in FIG. 2 and FIG. 3.
Figure 5:
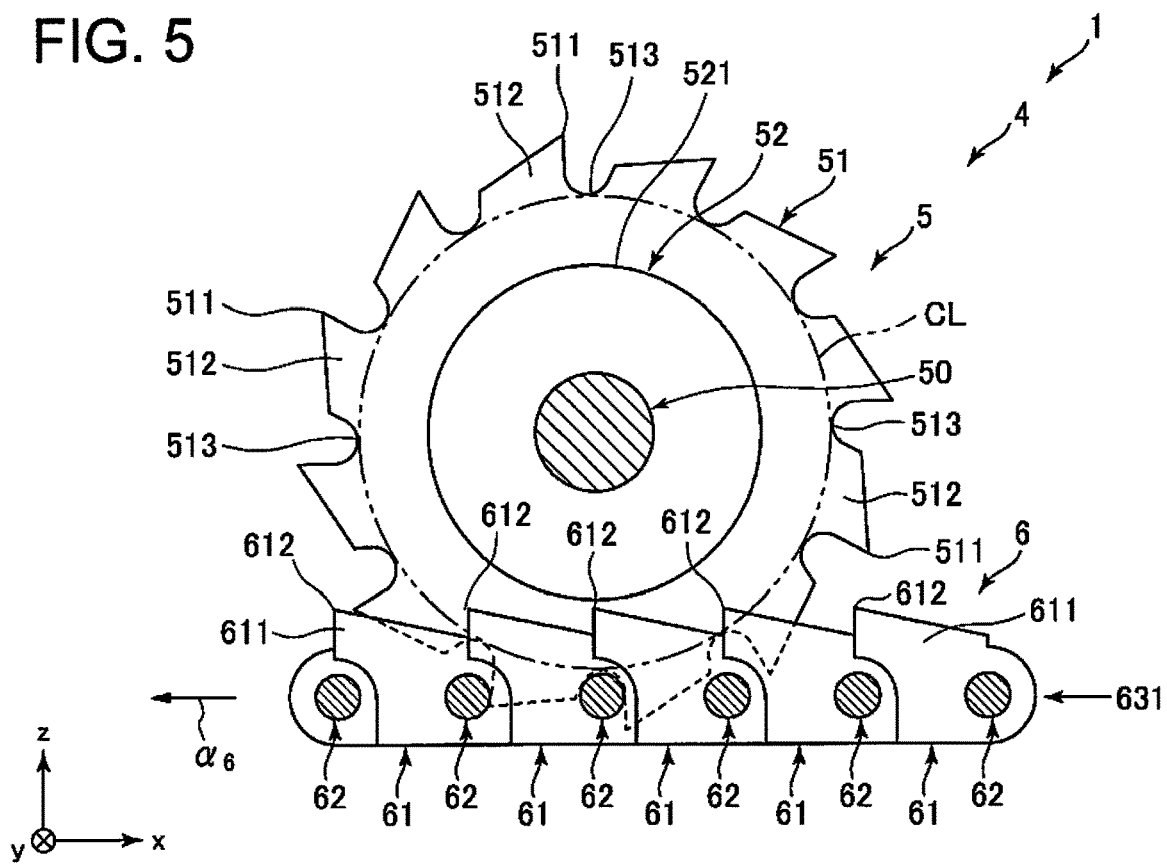
FIG. 5 shows the relative positions of the rotary cutter and circulating cutter shown in FIG. 4.
Figure 6:
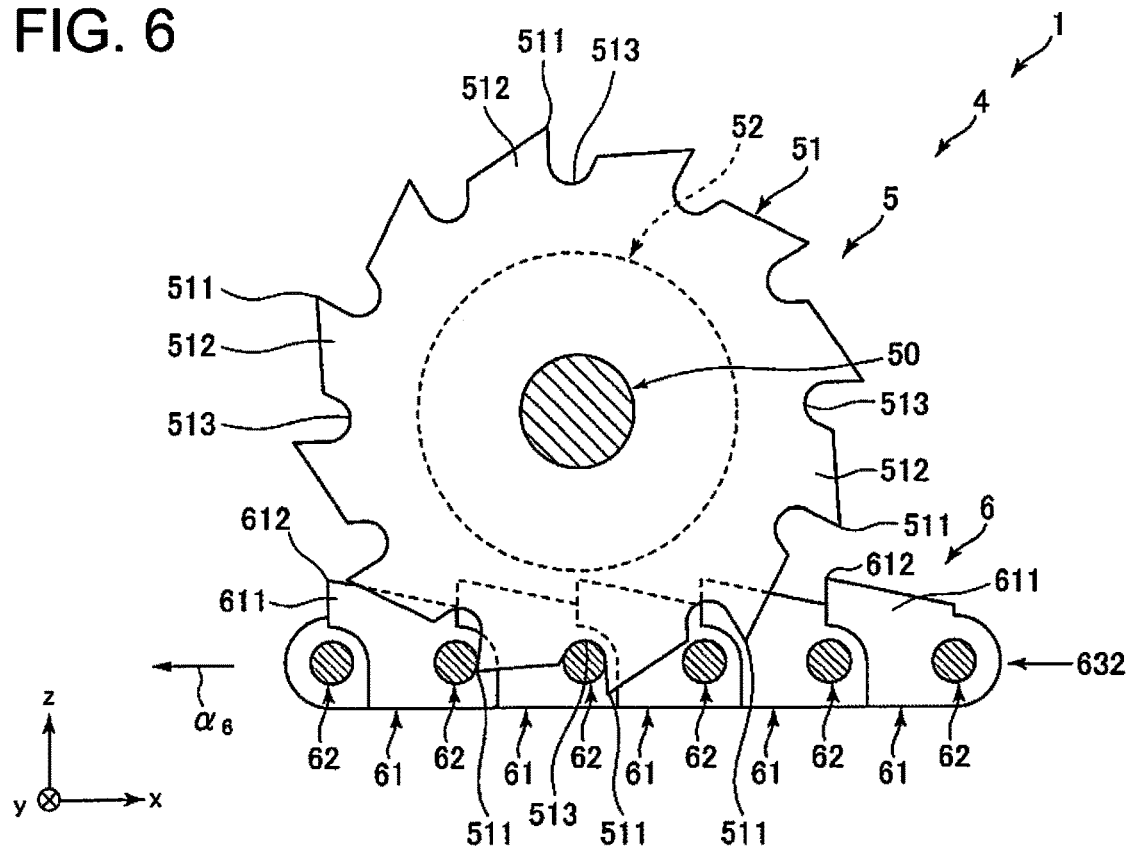
FIG. 6 shows the relative positions of the rotary cutter and circulating cutter shown in FIG. 4.

FIG. 1 is a schematic side view of a first embodiment of a sheet manufacturing apparatus according to the invention. FIG. 2 is a schematic side view of a shredder according to the invention that is incorporated in the sheet manufacturing apparatus shown in FIG. 1. FIG. 3 is a schematic side view of a variation of a shredder according to the invention that is incorporated in the sheet manufacturing apparatus shown in FIG. 1. FIG. 4 is a perspective view of main parts of the shredders shown in FIG. 2 and FIG. 3. FIG. 5 and FIG. 6 show the relative positions of the rotary cutter and circulating cutter shown in FIG. 4.

Note that for convenience below, embodiments of the invention are described with reference to three mutually perpendicular axes, an X-axis, Y-axis, and Z-axis, as shown in FIG. 1. The x-y plane containing the X-axis and Y-axis is horizontal, and the Z-axis is vertical, perpendicular to the x-y plane. The directions indicated by the arrow on each axis is referred to as the forward or positive (+) direction, and the opposite direction as the reverse or negative (−) direction. In addition, in FIG. 1 to FIG. 6 (and in FIG. 7 and FIG. 8) the side at the top is referred to as up or above; and the side at the bottom is referred to as down or below.

As shown in FIG. 1, the sheet manufacturing system 100 includes a shredder 1 including a feedstock supplier 3 and a shredding device 4, a defibrator 13, a classifier 14, a first web former 15, a cutter 16, a mixing device 17, a detangler 18, a second web former 19, a sheet former 20, a sheet cutter 21, a stacker 22, and a dust collector 27.

The sheet manufacturing system 100 also has wetting unit 231, wetting unit 232, wetting unit 233, wetting unit 234, wetting unit 235, and wetting unit 236. The sheet manufacturing system 100 also has a blower 261, blower 262, and blower 263.

Parts of the sheet manufacturing system 100 are electrically connected to a controller 28. Operation of those parts is controlled by the controller 28.

The controller 28 includes a CPU (central processing unit) 281 and storage 282. The CPU 281 can make various decisions and assert commands. The storage 282 stores programs, including a program controlling sheet S manufacturing. This controller 28 may be built into the sheet manufacturing system 100, or disposed to an external device such as an externally connected computer.

The external device may connect to and communicate with the sheet manufacturing system 100 through a cable or wirelessly, or connect to the sheet manufacturing system 100 through a network such as the Internet.

The CPU 281 and storage 282 may be integrated and configured as a single unit, or the CPU 281 may be incorporated in the sheet manufacturing system 100 with the storage 282 disposed to an external computer or other external device, or the storage 282 may be incorporated in the sheet manufacturing system 100 with the CPU 281 disposed to an external computer or other external device.

The sheet manufacturing system 100 executes, in order, a feedstock supply process, a shredding process, a defibrating process, a classification process, a first web forming process, a cutting process, a mixing process, a detangling process, a second web forming process, a sheet forming process, and a sheet cutting process.

The configurations of selected parts are described below.

The feedstock supplier 3 is the device that executes a feedstock supply process in which feedstock M1 in a sheet form is supplied to the feedstock supplier 3, which then supplies the feedstock M1 to the shredding device 4. The detailed configuration of the feedstock supplier 3 is described below.

The feedstock M1 is sheet material containing cellulose fiber.

The cellulose fiber may be any fibrous material containing mainly cellulose (narrowly defined cellulose) as a chemical compound, and in addition to cellulose (narrowly defined cellulose) may include hemicellulose or lignin. The form of the feedstock M1 is not specifically limited, and it may be woven cloth or non-woven cloth. The feedstock M1 may also be recycled paper manufactured by defibrating and recycling recovered paper, for example, or synthetic Yupo paper (R), and does not need to be recycled paper. In this embodiment, the feedstock M1 is previously used recovered paper.

The shredding device 4 is a device that cuts and shreds the feedstock M1 supplied from the feedstock supplier 3 in air or other gas. Note that shredding by the shredding device 4 in conjunction with defibration in the next downstream process may also be referred to as "destruction." The feedstock M1 after shredding by the shredding device 4 is referred to herein as the shreds M2.

As shown in FIG. 2 and FIG. 3, the shredding device 4 has a chute 41 into which the shreds M2 are temporarily collected. The chute 41 is shaped suitably to collecting the shreds M2, and in this example is funnel-shaped. The detailed configuration of the shredding device 4 is described below.

Above the chute 41 is disposed a wetting unit 231. The wetting unit 231 wets the shreds M2 in the chute 41. This wetting unit 231 has a filter containing water, and is configured as a heaterless humidifier that supplies a moist stream of air to the shreds M2 by passing air through the filter. By wet air being supplied to the shreds M2, accumulation of shreds M2 on the chute 41 due to static electricity can be suppressed.

The chute 41 connects to the defibrator 13 through a conduit 241. The shreds M2 collected in the chute 41 pass through the conduit 241 and are conveyed to the defibrator 13.

The defibrator 13 is the part that executes the defibrating process (see FIG. 5) that defibrates the shreds M2 in a dry process in air. Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strands and ribbons. The defibrated material M3 may also contain clumps, which are multiple fibers tangled together into clumps.

In this example the defibrator 13 is configured as an impeller mill having a rotor that turns at high speed, and a liner disposed around the outside of the rotor. The shreds M2 flowing into the defibrator 13 pass between the rotor and the liner and are defibrated.

The defibrator 13 also produces, by rotation of the rotor, a flow of air from the shredder 1 to the classifier 14. As a result, the shreds M2 can be suctioned from the conduit 241 into the defibrator 13. The defibrated material M3 can also be fed through conduit 242 to the classifier 14 after defibration.

A blower 261 is disposed to the conduit 242. The blower 261 is an air current generator that produces a flow of air to the classifier 14. Conveyance of the defibrated material M3 to the classifier 14 is thereby promoted.

The classifier 14 is the part that executes the classification process of classifying the defibrated material M3 based on the length of the fibers. In the classifier 14, the defibrated material M3 is separated into first screened material M4-1, and second screened material M4-2 that is larger than the first screened material M4-1. The first screened material M4-1 is of a size appropriate to manufacturing sheets S downstream.

The average length of the fibers is preferably greater than or equal to 1 μm and less than or equal to 30 μm.

The second screened material M4-2 includes, for example, fiber that has not been sufficiently defibrated, and excessively agglomerated (clumped) defibrated fibers.

The classifier 14 includes a drum 141, and a housing 142 enclosing the drum 141.

The drum 141 is a sieve comprising a cylindrical mesh body that rotates on its center axis. The defibrated material M3 is introduced to the drum 141. By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit 243 connected to the drum 141. The end of the conduit 243 is connected to the opposite side as the drum 141, that is, the downstream end of the conduit 243 is connected to conduit 241. The second screened material M4-2 that passes through the conduit 243 merges with the shreds M2 inside the conduit 241, and is introduced with the shreds M2 to the defibrator 13. As a result, the second screened material M4-2 is returned to the defibrator 13 and passes through the defibrating process with the shreds M2.

The first screened material M4-1 from the drum 141 is dispersed while dropping through air, and descends toward the first web former 15 located below the drum 141. The first web former 15 is the part that executes a first web forming process forming a first web M5 by accumulating the first screened material M4-1. The first web former 15 includes a mesh belt 151, three tension rollers 152, and a suction unit 153.

The mesh belt 151 is an endless belt on which the first screened material M4-1 accumulates. This mesh belt 151 is mounted on three tension rollers 152. By rotationally driving the tension rollers 152, the first screened material M4-1 deposited on the mesh belt 151 is conveyed downstream.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

The first screened material M4-1 may also contain dust and dirt, for example. The dust and dirt may be produced during shredding and defibration. Such dust and dirt is later recovered by the dust collector 27 described below.

The suction unit 153 is a suction mechanism that suctions air from below the mesh belt 151. As a result, dust and dirt that passes through the mesh belt 151 can be suctioned with the air.

The suction unit 153 is connected to a dust collector 27 through another conduit 244. Dust and dirt suctioned by the suction unit 153 is captured by the dust collector 27.

Another conduit 245 is also connected to the dust collector 27. A blower 262 is disposed to the conduit 245. Operation of the blower 262 produces suction in the suction unit 153. This promotes formation of the first web M5 on the mesh belt 151. Dust and dirt are therefore removed from the material forming the first web M5. Operation of the blower 262 causes the dust and dirt to pass through the conduit 244 to the dust collector 27.

The housing 142 is connected to a wetting unit 232. Like the wetting unit 231 described above, the wetting unit 232 is a heaterless humidifier. As a result, humidified air is supplied into the housing 142. This wet air moistens the first screened material M4-1, and as a result can suppress accretion of the first screened material M4-1 on the inside walls of the housing 142 due to static electricity.

Another wetting unit 235 is disposed downstream from the classifier 14. This wetting unit 235 is configured as an ultrasonic humidifier that mists water. As a result, moisture can be supplied to the first web M5, and the moisture content of the first web M5 can thereby be adjusted. This adjustment can also suppress accretion of the first web M5 on the mesh belt 151 due to static electricity. As a result, the first web M5 easily separates from the mesh belt 151 at the tension roller 152 from where the mesh belt 151 returns to the upstream side.

On the downstream side of the wetting unit 235 is a cutter 16. The cutter 16 is a part that executes a cutting process of cutting the first web M5 that has separated from the mesh belt 151.

The cutter 16 has a propeller 161 that is rotationally supported, and a housing 162 that houses the propeller 161. The first web M5 is cut into pieces as it is fed into the rotating propeller 161. The cut first web M5 is thus processed into fragments M6. The fragments M6 then drop down in the housing 162.

The housing 162 is connected to another wetting unit 233. Like wetting unit 231 described above, wetting unit 233 is a heaterless humidifier. As a result, humidified air is supplied into the housing 162. This wet air suppresses sticking of the fragments M6 to the propeller 161 and to the inside walls of the housing 162 due to static electricity.

A mixing device 17 is disposed on the downstream side of the cutter 16. The mixing device 17 is the part that executes a mixing process of mixing the fragments M6 with resin P1. The mixing device 17 includes a resin supply device 171, a conduit 172, and a blower 173.

The conduit 172 connects the housing 162 of the cutter 16 to the housing 182 of the detangler 18, and is a flow path through which a mixture M7 of the fragments M6 and resin P1 passes.

The resin supply device 171 connects to the conduit 172. The resin supply device 171 has a screw feeder 174. By rotationally driving the screw feeder 174, the resin P1 can be supplied in powder or particle form to the conduit 172. The resin P1 supplied to the conduit 172 is mixed with the fragments M6, forming the mixture M7.

Note that the resin P1 bonds fibers together in a downstream process, and may be a thermoplastic resin or a thermosetting resin, but is preferably a thermoplastic resin. Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate or other polyesters, nylon 6, nylon 46, nylon 66, nylon 610, nylon 612, nylon 11, nylon 12, nylon 6-12, nylon 6-66 or other polyimide (nylon), polyphenylene ether, polyacetal, polyether, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing. Preferably, a polyester or resin containing a polyester is used as the thermoplastic resin.

Additives other than resin P1 may also be supplied from the resin supply device 171, including, for example, coloring agents for adding color to the fiber, anti-blocking agents for suppressing clumping of the fiber and clumping of the resin P1, flame retardants for making the fiber and manufactured sheets difficult to burn, and paper strengtheners for increasing the strength of the sheet S. Compounds already incorporating such other additives with the resin P1 may also be supplied from the resin supply device 171.

The blower 173 is disposed to the conduit 172 downstream from the resin supply device 171. The fragments M6 and resin P1 are also mixed by the action of a rotating unit such as blades of the blower 173.

The blower 173 is configured to produce an air current toward the detangler 18. This air current can also mix the fragments M6 and resin P1 inside the conduit 172. As a result, the mixture M7 can be introduced to the detangler 18 as a uniform dispersion of the fragments M6 and resin P1. The fragments M6 in the mixture M7 are further detangled into smaller fibers while travelling through the conduit 172.

The detangler 18 is the part that executes the detangling process that detangles interlocked fibers in the mixture M7.

The detangler 18 includes a drum 181 and a housing 182 that houses the drum 181.

The drum 181 is a sieve comprising a cylindrical mesh body that rotates on its center axis. The mixture M7 is introduced to the drum 181. By the drum 181 rotating, fiber in the mixture M7 that is smaller than the mesh can pass through the drum 181. The mixture M7 is detangled in this process.

Another wetting unit 234 is connected to the housing 182. Like the wetting unit 231 described above, wetting unit 234 is a heaterless humidifier. As a result, humidified air is supplied into the housing 182. By humidifying the inside of the housing 182 by adding wet air, sticking of the mixture M7 to the inside walls of the housing 182 due to static electricity can be suppressed.

The mixture M7 that is detangled in the drum 181 is dispersed while dropping through air, and falls to the second web former 19 located below the drum 181. The second web former 19 is the part that executes the second web forming process forming a second web M8 from the mixture M7. The second web former 19 includes a mesh belt 191, tension rollers 192, and a suction unit 193.

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

The suction unit 193 is a suction mechanism for suctioning air from below the mesh belt 191. As a result, the mixture M7 can be pulled onto the mesh belt 191, and accumulation of the mixture M7 on the mesh belt 191 is thereby promoted.

Another conduit (flow path) 246 is connected to the suction unit 193. A blower 263 is also disposed to the conduit 246. Operation of the blower 263 produces suction in the suction unit 193.

Another wetting unit 236 is disposed below the detangler 18. This wetting unit 236 is configured as an ultrasonic humidifier similarly to the wetting unit 235 described above. As a result, moisture can be supplied to the second web M8, and the moisture content of the second web M8 can thereby be adjusted. Adjusting the moisture content can also suppress sticking of the second web M8 to the mesh belt 191 due to static electricity. As a result, the second web M8 easily separates from the mesh belt 191 at the tension roller 192 from where the mesh belt 191 returns to the upstream side.

Note that the amount of moisture (total moisture content) added by wetting unit 231 to wetting unit 236 is, for example, preferably greater than or equal to 0.5 parts by weight and less than or equal to 20 parts by weight per 100 parts by weight of the material before adding water.

A sheet former 20 is disposed downstream from the second web former 19. The sheet former 20 is the part that executes the sheet forming process forming sheets S from the second web M8. This sheet former 20 includes a calender 201 and a heater 202.

The calender 201 comprises a pair of calender rolls 203, and the second web M8 can be compressed without heating by passing the second web M8 between the calender rolls 203. This process increases the density of the second web M8. Heating at this time is preferably by a temperature below the melting point of the resin P1.

The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which can heat while compressing the second web M8 passing between the heat rollers 204. The combination of heat and pressure melts the resin P1 in the second web M8, and bonds fibers through the molten resin P1. As a result, a sheet S is formed.

The sheet S is then conveyed to the paper cutter 21. Note that one of the pair of heat rollers 204 is a drive roller that is driven by operation of a motor (not shown in the figure), and the other is a driven roller.

A paper cutter 21 is disposed downstream from the sheet former 20. The paper cutter 21 is the part that executes the sheet cutting process that cuts the continuous sheet S into single sheets S. The paper cutter 21 includes a first cutter 211 and a second cutter 212.

The first cutter 211 cuts the sheet S in the direction crosswise to the conveyance direction of the sheet S.

The second cutter 212 is downstream from the first cutter 211, and cuts the sheets S in the direction parallel to the conveyance direction of the sheet S.

This cutting process removes unwanted material from the edges of the sheet S (the opposite sides on the Y-axis), and the removed portion is referred to as trimmings or cut-offs.

Sheets S of a desired shape and size are produced by the cutting action of the first cutter 211 and the second cutter 212. The sheets S are then conveyed further downstream and stacked in a stacker 22.

The shredder 1 functions as a shredding or destruction device that cuts the feedstock M1 into shreds M2. As described above, the shredder 1 includes the feedstock supplier 3 whereby feedstock M1 is supplied downstream, and a shredding device 4 that cuts and shreds the feedstock M1 supplied from the feedstock supplier 3. The configuration of these parts is described below.

As shown in FIG. 2 and FIG. 3, the shredding device 4 includes a rotary cutter 5 disposed parallel to the Y-axis, a driver 42 that rotationally drives the rotary cutter 5, and a circulating cutter 6 that cuts the feedstock M1 conveyed between the rotary cutter 5 and circulating cutter 6.

As shown in FIG. 4, the rotary cutter 5 includes a first shaft 50 disposed parallel to the Y-axis, and first rotary blades 51 and second rotary blades 52 rotatably supported on the first shaft 50. More specifically, the rotary cutter 5 has a first shaft 50, and first rotary blades 51 and second rotary blades 52 disposed in fixed positions on the first shaft 50.

The first shaft 50 in this example is a rod that is round in cross section. The first shaft 50 is supported at both ends, and one end is connected to the driver 42. By operating the driver 42, the first shaft 50 turns clockwise, that is, in the direction of arrow a5, together with the first rotary blades 51 and second rotary blades 52.

Multiple first rotary blades 51 and multiple second rotary blades 52 are mounted on the first shaft 50. The first rotary blades 51 and second rotary blades 52 alternate along the length of the first shaft 50. Note that for simplicity, only one first rotary blade 51 typical of the multiple first rotary blades 51 is shown in FIG. 4. Likewise, only one second rotary blade 52 typical of the multiple second rotary blades 52 is shown in FIG. 4.

Each of the first rotary blades 51 is round with a hole in the center through which the first shaft 50 passes. The first rotary blades 51 rotates with the first shaft 50 in the direction of arrow a5. The first rotary blades 51 may be formed in unison with the first shaft 50, press fit, or secured by a key and slot configuration.

Teeth 512 having a sharp cutting edge 511 are formed projecting in the direction of arrow a5, that is, in the direction of forward rotation of the first rotary blade 51, are formed around the circumference of each first rotary blade 51. The teeth 512 are disposed equidistantly around the circumference of the first rotary blade 51.

There are twelve teeth 512 in this embodiment of the invention, but the invention is not so limited and the number of teeth may be determined desirably according to the size of the first rotary blade 51.

A gullet 513 is formed between circumferentially adjacent teeth 512. The gullet 513 is curved when seen from the Y-axis side.

Each of the second rotary blades 52 is round with a hole in the center through which the first shaft 50 passes. As a result, the second rotary blades 52 are disposed concentrically to the first rotary blades 51.

The second rotary blades 52 rotate together with the first rotary blades 51 and the first shaft 50 in the direction of arrow a5. The second rotary blades 52 may be formed in unison with the first shaft 50, press fit, or secured by a key and slot configuration.

The outside edge 521 of the second rotary blade 52 is round when seen from the Y-axis, and the second rotary blades 52 are smaller in diameter than the first rotary blades 51. More specifically, when seen from the Y-axis, the teeth 512 of the first rotary blade 51 extend further to the outside radially than the outside edge 521 of the second rotary blade 52.

The size of the second rotary blade 52 is not specifically limited, and, as shown in FIG. 5, is preferably smaller than a circle CL concentric to the first shaft 50 and touching each gullet 513.

The first rotary blade 51 and second rotary blade 52 are preferably made from hardened steel, for example.

While there are multiple first rotary blades 51 and second rotary blades 52, the number of each is not specifically limited, but there must be at least one of each.

The thickness of each first rotary blade 51 is the same in the configuration shown in FIG. 4, but the invention is not so limited and the first rotary blades 51 may vary in thickness.

The thickness of each of the second rotary blades 52 may also be the same or different.

The thickness of the first rotary blades 51 and the thickness of the second rotary blade 52 are the same in the configuration shown in FIG. 4, but the invention is not so limited and the rotary blades may differ in thickness.

The thickness of the first rotary blades 51 and second rotary blades 52 is not specifically limited, but is desirably greater than or equal to 1 mm and less than or equal to 10 mm, and further preferably less than or equal to 2 mm and greater than or equal to 5 mm.

The rotary cutter 5 therefore comprises at least one disk-shaped first rotary blade 51, and a second rotary blade 52 that is smaller in diameter than the first rotary blade 51 and is disposed concentrically to the first rotary blade 51.

The rotary cutter 5 in this embodiment of the invention, however, has multiple first rotary blades 51 and multiple second rotary blades 52. As shown in FIG. 4, the first rotary blades 51 and second rotary blades 52 are disposed alternately along the first shaft 50. As a result, a large cutting area AR in which the feedstock M1 is cut can be assured in the Y-axis direction between the rotary cutter 5 and the circulating cutter 6. This cutting area AR enables quickly shredding the feedstock M1 regardless of the size, sheet count, and alignment of the feedstock M1.

The rotary cutter 5 thus configured can be driven by the driver 42. The configuration of the driver 42 is not specifically limited, and the driver 42 may be configured with a motor and a speed reducer comprising multiple meshing gears, for example.

Turning the gears of the speed reducer can also be driven by the motor. Torque from the motor is transferred to the first shaft 50, and the rotary cutter 5 can be turned around the first shaft 50 as the first shaft 50 turns.

The driver 42 is configured in this embodiment to primarily drive the rotary cutter 5 and transfer the drive power to the circulating cutter 6 so that the circulating cutter 6 follows the rotary cutter 5, but the invention is not so limited and may be configured to primarily drive the circulating cutter 6 of the rotary cutter 5 by means of a driver (not shown in the figure) that primarily drives the circulating cutter 6. In this case, when the circulating cutter 6 is travelling circularly, power to turn the rotary cutter 5 is transferred to the rotary cutter 5.

As shown in FIG. 2 and FIG. 3, a circulating cutter 6 that meshes with the rotary cutter 5 is disposed below the rotary cutter 5. The circulating cutter 6 travels through a non-circular endless path. In this embodiment of the invention the circulating cutter 6 moves circularly along a path including a flat portion, and circulates while repeatedly moving to and away from the rotary cutter 5 in the direction of arrow a6, which is a second axial direction intersecting the first shaft 50. While travelling circularly, the circulating cutter 6 cuts the feedstock M1 between the circulating cutter 6 and rotary cutter 5.

As shown in FIG. 4, the circulating cutter 6 has multiple teeth 61 with a blade 611 that cuts the feedstock M1 in conjunction with the rotary cutter 5, and multiple pins 62 that rotatably link adjacent teeth 61.

For simplicity, only a few of the teeth 61 representative of the multiple teeth 61 are shown in FIG. 4. Likewise, only a few of the pins 62 representative of the multiple pins 62 are shown in FIG. 4.

The multiple teeth 61 of the circulating cutter 6 are connected in a line along the X-axis, forming a tooth chain, and multiple rows of teeth 61 are disposed along the Y-axis. A representative first tooth chain 631, and a second tooth chain 632 on the positive Y-axis side of the first tooth chain 631, are shown in FIG. 4.

Part of a first rotary blade 51 of the rotary cutter 5 fits between the first tooth chain 631 and second tooth chain 632. The first tooth chain 631 and second tooth chain 632 each face a corresponding second rotary blade 52. As a result of these relative positions, when the rotary cutter 5 turns and the circulating cutter 6 travels circularly, the feedstock M1 can be cut between the first rotary blades 51 of the rotary cutter 5 and the teeth 61 at multiple places along the X-axis. As a result, multiple shreds M2 can be formed in strips.

As shown in FIG. 5, the blade 611 of each tooth 61 has a cutting edge 612 formed at the leading end in the direction of arrow a6. Each cutting edge 612 can sequentially contact the outside edge 521 of the second rotary blade 52 of the rotary cutter 5. Each time such contact occurs, the shreds M2 can be cut lengthwise between the cutting edge 612 and the second rotary blade 52. In other words, the shreds M2 can be cut across the Y-axis. As a result, multiple short shreds M2 can be produced. The resulting shreds M2 are sized desirably for defibrating by the defibrator 13.

As shown in FIG. 4, the pins 62 are configured by rods that are circular in cross section. The pins 62 link adjacent teeth 61 in the first tooth chain 631 and second tooth chain 632, and thereby also connect the first tooth chain 631 and the second tooth chain 632.

As shown in FIG. 6, the pins 62 can also sequentially contact the cutting edge 511 of the first rotary blade 51 in conjunction with the circular travel of the circulating cutter 6. Each time such contact is made, the shreds M2 can also be cut lengthwise between the pins 62 and cutting edges 511. More specifically, the shreds M2 can be cut across the Y-axis. As a result, multiple short shreds M2 can be produced. The resulting shreds M2 are sized desirably for defibrating by the defibrator 13.

As described above, the shredding device 4 has a driver 42 that rotationally drives the rotary cutter 5 around the first shaft 50. The rotary cutter 5 also has gullets 513 formed between circumferentially adjacent teeth 512.

As shown in FIG. 6, the gullets 513 of the rotary cutter 5 sequentially mesh with the pins 62 of the circulating cutter 6, and function as transfer parts that transfer power causing the circulating cutter 6 to move circularly in conjunction with rotation of the rotary cutter 5 on the first shaft 50. As a result, the need to provide a driver separately from the driver 42 to drive the circulating cutter 6 circularly is omitted, and the configuration and control of the shredding device 4 is simplified.

As described above, the circulating cutter 6 is configured as a chain 60 having multiple teeth 61, each with a blade 611 that cuts the feedstock M1 in conjunction with the rotary cutter 5, connected together through pins 62 allowing circular travel. As a result, the circulating cutter 6 configured as a chain 60 forms an endless loop as shown in FIG. 2 and FIG. 3.

The shredding device 4 includes a support mechanism 43 that supports the circulating cutter 6 to move circularly. The support mechanism 43 is configured by two sprockets 431 separated from each other on the X-axis. The circulating cutter 6 wraps around the sprockets 431. As the circulating cutter 6 moves circularly in the direction of arrow a6, the sprockets 431 also rotate in the direction of arrow a431. As a result, the circularly moving circulating cutter 6 can be stably supported.

By configuring the circulating cutter 6, and more specifically the chain 60, in an endless loop, the teeth 61 and pins 62 of the circulating cutter 6 can repeatedly approach the rotary cutter 5, and as described above can cut the feedstock M1 into strips of shreds M2.

Note that the teeth 61 and pins 62 are preferably made from hardened steel.

As shown in FIG. 2 and FIG. 3, the circulating cutter 6 is configured as a chain 60 as described above, and the portion that carries the feedstock M1 to the rotary cutter 5 embodies a conveyor 64. More specifically, the portion that supplies feedstock M1 from the feedstock supplier 3 to the rotary cutter 5 functions as a conveyor 64.

As described above, the feedstock M1 is previously used recovered paper. As a result, the feedstock M1 may include feedstock M1 that has been folded or creased, feedstock M1 that is curled, feedstock M1 that is wrinkled, feedstock M1 that is rolled up, and other types of deformed feedstock M1. Even when the feedstock M1 is so deformed, the feedstock M1 can be smoothly delivered by the conveyor 64 to the rotary cutter 5, and the feedstock M1 can be shredded by the shredding device 4.

In the conveyor 64 the teeth 61 are connected in a straight line horizontally, that is, on the x-y plane. As a result, the feedstock M1 can be consistently conveyed, and the feedstock M1 can be cut by the rotary cutter 5 into which the feedstock M1 is fed.

Note that the conveyor 64 may include a part forming a curve in at least part.

By the circulating cutter 6 thus comprising a conveyor 64, the feedstock supplier 3 can be configured as shown in FIG. 2 or configured as shown in FIG. 3 according to where the supply opening 31 through which the feedstock M1 is supplied is formed.

In either configuration as shown in FIG. 2 and FIG. 3, the feedstock supplier 3 has a housing 32 covering the conveyor 64 from above. The housing 32 includes a ceiling 321 facing the conveyor 64, and side panels enclosing the conveyor 64 in plan view. The supply opening 31 communicating the inside and outside of the housing 32 is formed in the housing 32.

In the configuration shown in FIG. 2, the supply opening 31 is formed on the positive X-axis side of the ceiling 321 at a position facing the conveyor 64.

In the configuration shown in FIG. 3, the supply opening 31 is formed on the positive X-axis side of the side panels at a position facing the rotary cutter 5.

The configuration shown in FIG. 2 makes loading the feedstock M1 simple when the supply opening 31 is located at a position lower than the hip height of the typical user of the sheet recycling system 100.

The configuration shown in FIG. 3 makes loading the feedstock M1 simple when the supply opening 31 is located at a position higher than the hip height of the typical user of the sheet recycling system 100.

The feedstock supplier 3 thus comprised enables changing the location of the supply opening 31 in the housing 32 according to the height where the supply opening 31 is formed.

Note that the configuration shown in FIG. 2 and the configuration shown in FIG. 3 may be combined. More specifically, the supply opening 31 of the configuration shown in FIG. 3 may be included in the feedstock supplier 3 of the configuration shown in FIG. 2.

As described above, the feedstock M1, which is previously used recovered paper may include feedstock M1 that has been folded or creased, feedstock M1 that is curled, feedstock M1 that is wrinkled, feedstock M1 that is rolled up, and other types of deformed feedstock M1. Therefore, the size of the opening of the supply opening 31 is preferably large enough to accommodate various types of feedstock M1 regardless of the size and shape of the feedstock M1.

The supply opening 31 is separated from the rotary cutter 5 by the conveyor 64 portion of the circulating cutter 6. As a result, even when the size of the supply opening 31 is sufficiently large enough, the hands and arms of the user of the sheet recycling system 100 can be prevented from reaching from the supply opening 31 to between the rotary cutter 5 and circulating cutter 6. As a result, the hands and arms of the user can be prevented from being pulled between the rotary cutter 5 and circulating cutter 6, and user safety is improved.

A motion detector 33 is disposed near the supply opening 31 inside the housing 32. The type of motion detector 33 is not specifically limited, and may be a sensor that detects infrared rays emitted from a hand or arm of the user, or other type of sensor, including a capacitance sensor or a laser sensor. As a result, if a hand or arm of the user penetrates the supply opening 31, the penetration can be detected. The detection result is then reported through an alarm device not shown, for example. As a result, the user can be prompted to remove the arm or hand from the supply opening 31.

A configuration that unconditionally stops driving the rotary cutter 5 and circulating cutter 6 when such penetration is detected is also conceivable.

As described above, by the circulating cutter 6 having a conveyor 64 in the sheet recycling system 100, greater freedom is achieved in determining the size, shape, number, and location of the supply openings 31 when designing the feedstock supplier 3.

As described above, the shredder 1 according to this embodiment of the invention has a feedstock supplier 3 with a supply opening 31 through which sheets are supplied as the feedstock M1, and a shredding device 4 that cuts and shreds the feedstock M1 (sheets) supplied from the feedstock supplier 3.

The shredding device 4 includes a rotary cutter 5 that turns in the direction of arrow a5 on a first shaft 50 (first axis); and a circulating cutter 6 that cuts the feedstock M1 in conjunction with the rotary cutter 5 while moving in a non-round endless path, that is, moving constantly in a circulating path with the teeth 61 repeatedly moving to and away from the rotary cutter 5 in the direction of arrow a6, which is a second axial direction intersecting the first shaft 50.

The circulating cutter 6 also has a conveyor 64 that conveys the feedstock M1 from the feedstock supplier 3 to the rotary cutter 5.

The invention thus comprised can provide a greater degree of freedom of design in the size, shape, number, and location of the supply openings 31 when designing the feedstock supplier 3 because of the conveyor 64. More particularly, greater freedom is achieved for designing the shape and pattern of the circulating cutter 6, and the length and location of the conveyor 64.

A sheet recycling system 100 according to the invention includes the shredder 1 described above, and makes new sheets S from the shreds of feedstock M1 produced by the shredder 1.

As a result, sheets S can be desirably and efficiently made while reaping the benefits of the shredder 1 according to the invention.

Embodiment 2

Figure 7:
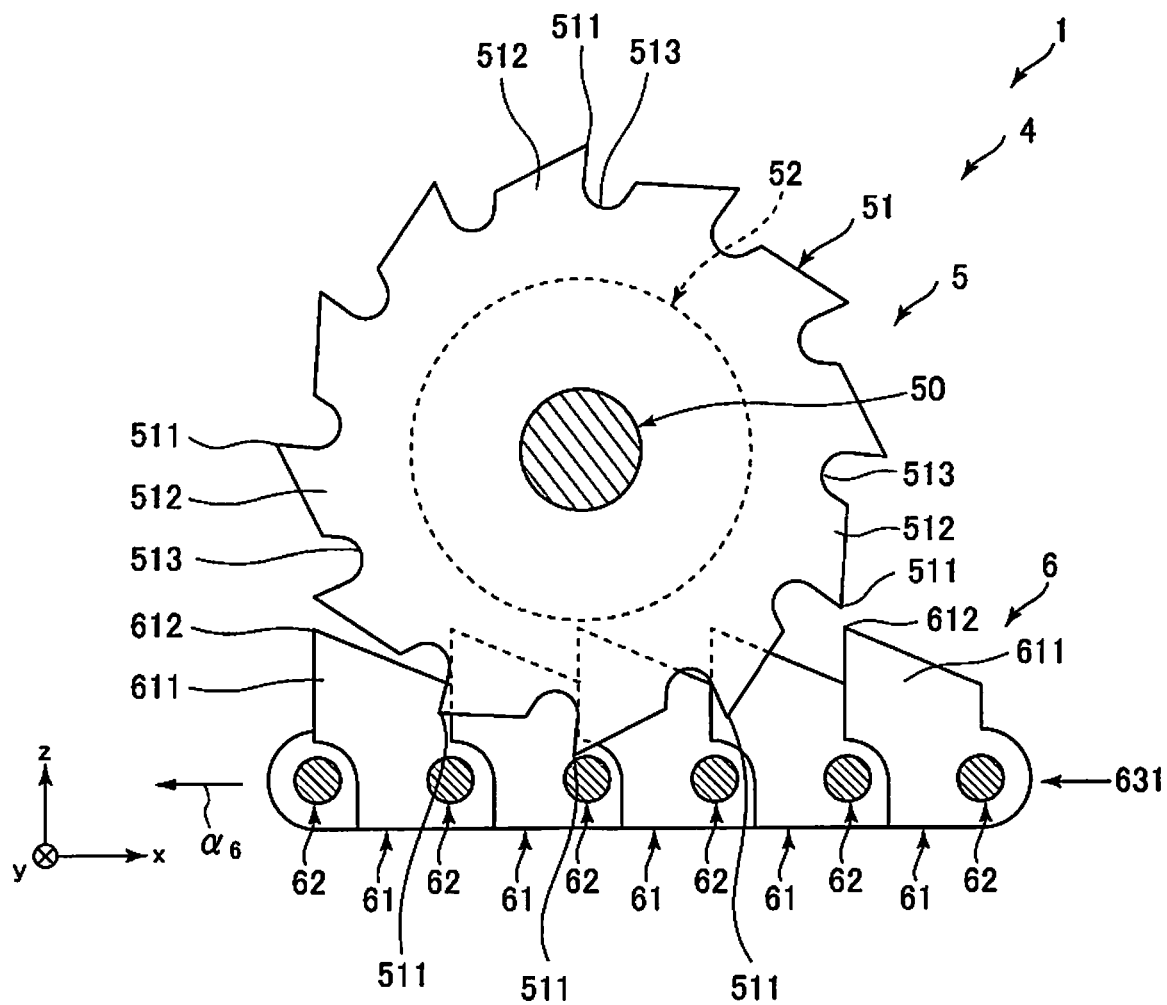
FIG. 7 shows the relative positions of the rotary cutter and circulating cutter in a second embodiment of a shredder according to the invention.

FIG. 7 shows the relative positions of the rotary cutter and circulating cutter in a second embodiment of a shredder according to the invention.

A second embodiment of a shredder and sheet manufacturing apparatus according to the invention are described below with reference to the accompanying figures, focusing on the differences between the embodiments and omitting or abbreviating description of like elements.

This embodiment is the same as the first embodiment except for differences in the relative positions of the rotary cutter and the circulating cutter.

As shown in FIG. 7, in this embodiment the first rotary blade 51 of the rotary cutter 5 is disposed to a position sufficient to prevent the pins 62 of the circulating cutter 6 from entering the gullets 513. In this configuration, a driver not shown in the figures for moving the circulating cutter 6 circularly is provided separately from the driver 42 described above.

This configuration is particularly effective when driving the rotary cutter 5 and moving the circulating cutter 6 independently is desired.

Embodiment 3

Figure 8:
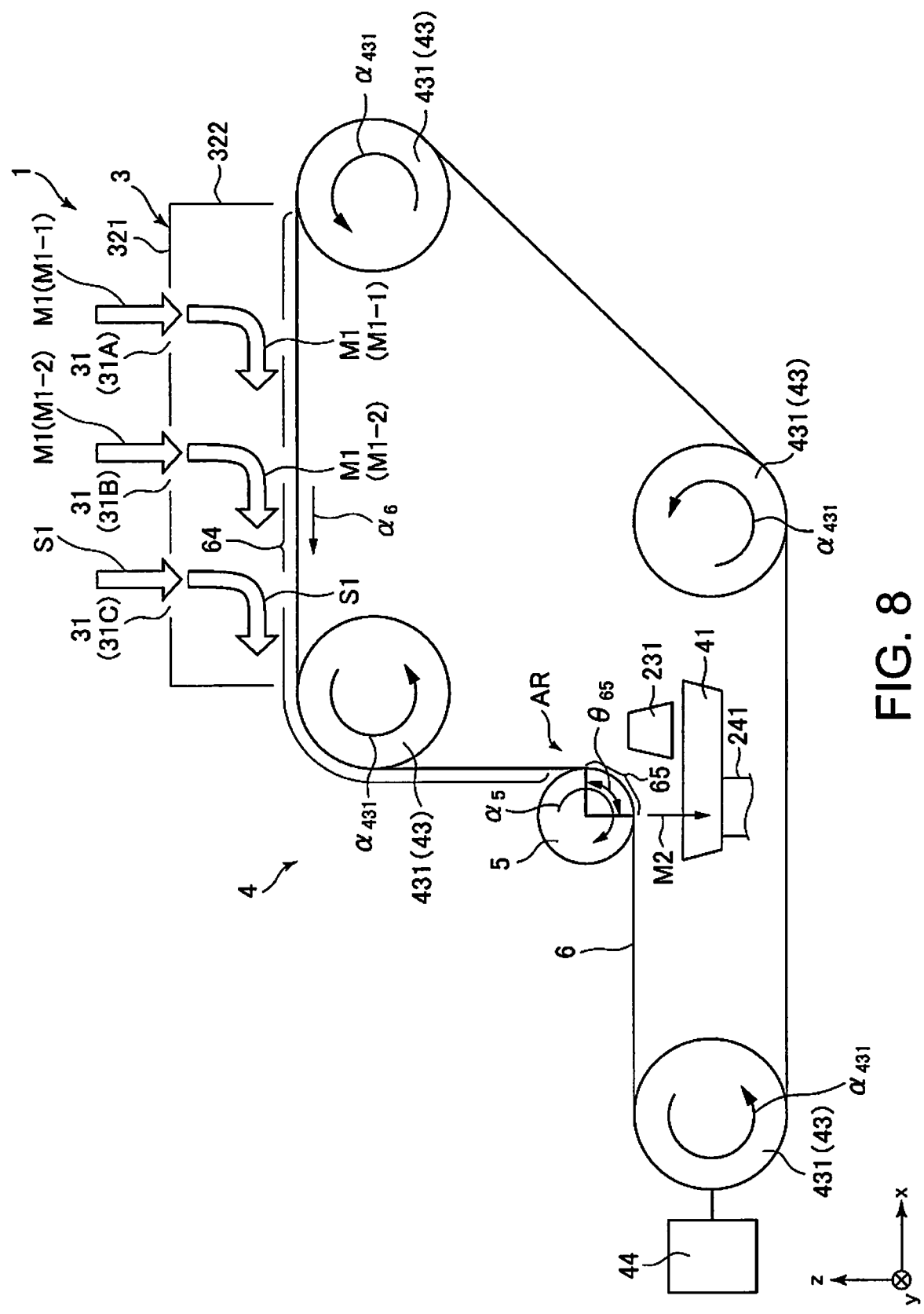
FIG. 8 is a schematic side view of a shredder according to a third embodiment of the invention.

FIG. 8 is a schematic side view of a shredder according to a third embodiment of the invention.

A third embodiment of a shredder and sheet manufacturing apparatus according to the invention are described below with reference to the accompanying figures, focusing on the differences between the embodiments and omitting or abbreviating description of like elements.

This embodiment is the same as the first embodiment except for the configuration of the shredder.

As shown in FIG. 8, the circulating cutter 6 of the shredder 1 according to this embodiment winds around four sprockets 431.

Of the four sprockets 431, a driver 44 for moving the circulating cutter 6 in an endless path is connected to one sprocket 431. The configuration of the driver 44 is not specifically limited, and the driver 44 may be configured with a motor and a speed reducer comprising multiple meshing gears, for example.

The feedstock supplier 3 in this configuration has three supply openings 31 formed in the ceiling 321. The three supply openings 31 are disposed equally spaced along the conveyance direction of the feedstock M1 by the circulating cutter 6. Below, the three supply openings 31 are referred to as sequentially from the upstream side in the conveyance direction of the feedstock M1 as supply opening 31A, supply opening 31B, and supply opening 31C.

Feedstock M1 is force fed by a powered conveyance roller not shown into the supply opening 31A. The feedstock M1 fed through supply opening 31A is referred to be low as feedstock M1-1. This feedstock M1-1 is sheet media.

Feedstock M1 is fed by hand, that is, manually, into supply opening 31B. This feedstock M1 is referred to below as feedstock M1-2. This feedstock M1-2 is also sheet media.

As described above, the sheet recycling system 100 has a sheet cutter 21 that cuts the sheet S. This sheet cutter 21 has a second cutter 212.

The second cutter 212 cuts the sheet S on one side and the other side of the sheet S in the direction crosswise to the conveyance direction, that is, on opposite sides of the sheet on the Y-axis. These cuts produce cut-offs S1 in strips, also referred to as trimmings. These cut-offs S1 are also sheets, and are conveyed through a path not shown back to the supply opening 31C of the shredder 1 for shredding and reuse, or stocked for later use.

As shown in FIG. 8, the circulating cutter 6 comprising a chain 60 configuration as described above has a winding portion 65 where the teeth 61 travel circumferentially around the rotary cutter 5. The winding portion 65 is formed directly after the conveyor 64. Note that the winding angle θ65 of the winding portion 65 is 90 degrees in the configuration shown in FIG. 8, but the invention is not so limited and the angle may be greater than or equal to 5 degrees and less than or equal to 20 degrees.

The winding portion 65 in this configuration creates an even larger cutting area AR. As a result, even if feedstock M1-1, feedstock M1-2 and cut-offs S1 are supplied substantially simultaneously, the feedstocks can be quickly and smoothly shredded.

Note that this embodiment describes the rotary cutter 5 as driven by driving the circulating cutter 6, but the invention is not so limited and configurations in which the circulating cutter 6 is driven by driving the rotary cutter 5 are also conceivable.

Configurations in which rotation of the rotary cutter 5 and circular movement of the circulating cutter 6 are controlled independently are also conceivable.

Preferred embodiments of a shredder and sheet manufacturing apparatus according to the invention are described above, but the invention is not so limited. More specifically, elements of the shredder and sheet manufacturing apparatus may be replaced by desirable configurations having the function and effect. Other desired configurations may also be added.

The shredder and sheet manufacturing apparatus of the invention may also be configured with two or more desirable configurations (parts, features) of the embodiments described above.

In addition, the first rotary blades disposed along the Y-axis may be mutually offset along the first axis at a specific angle around the first axis (first shaft 50). The first rotary blades may also be disposed in a spiral along the length of the first axis.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2018-141617, filed Jul. 27, 2018 is expressly incorporated by reference herein.

What is claimed is:

1. A shredder comprising:
a feedstock supplier having a supply opening through which a sheet is supplied; and
a shredding device configured to shred the sheet supplied from the feedstock supplier, the shredding device including
a rotary cutter that rotates on a first axis, the rotatory cutter including a first rotary blade that has a cutting edge, and
a circulating cutter that moves in an endless path and cuts the sheet in conjunction with the rotary cutter, the circulating cutter including
a conveyor configured to convey the sheet from the feedstock supplier to the rotary cutter,
a chain of a plurality of rotatably connected teeth each having a blade to cut the sheet in conjunction with the rotary cutter, and
a plurality of pins each of which links adjacent teeth of the plurality of rotatably connected teeth,
the plurality of pins and the first rotary blade being arranged such that at least one of the plurality of pins contacts the cutting edge of the first rotary blade in conjunction with movement of the circulating cutter.

2. The shredder described in claim 1, wherein:
the chain includes the conveyor configured by a part of the chain that conveys the sheet to the rotary cutter.

3. The shredder described in claim 1, wherein:
the conveyor links the teeth in a line.

4. The shredder described in claim 1, wherein:
the chain is disposed with the teeth winding circumferentially along the rotary cutter.

5. The shredder described in claim 1, wherein:
the chain is endless.

6. The shredder described in claim 1, wherein:
the supply opening is disposed facing the conveyor.

7. The shredder described in claim 1, wherein:
the supply opening is disposed facing the rotary cutter.

8. The shredder described in claim 1, wherein:
the rotary cutter further includes a second rotary blade that is disk-shaped, disposed concentrically to the first rotary blade, and is smaller in diameter than the first rotary blade.

9. The shredder described in claim 8, wherein:
the rotary cutter includes multiple first rotary blades and multiple second rotary blades;
and the first rotary blades and second rotary blades are alternately disposed along the first axis.

10. The shredder described in claim 1, wherein:
the shredding device has a driver configured to turn the rotary cutter around the first axis; and
the rotary cutter meshes with the circulating cutter, and the circulating cutter moves along the endless path in conjunction with rotation of the rotary cutter on the first axis.

11. A sheet manufacturing apparatus comprising:
the shredder described in claim 1; and
configured to make a new sheet from feedstock acquired by the shredder shredding a sheet.

* * * * *